W. L. SUTTON.
LAND LEVELER.
APPLICATION FILED DEC. 15, 1914.

1,164,142.

Patented Dec. 14, 1915.
2 SHEETS—SHEET 1.

Witnesses
C. F. Rudolph
Wm. Dagger

Inventor
W. L. Sutton,
By Victor J. Evans
Attorney

COLUMBIA PLANOGRAPH CO., WASHINGTON, D. C.

UNITED STATES PATENT OFFICE.

WILLIAM L. SUTTON, OF NIWOT, COLORADO.

LAND-LEVELER.

1,164,142.  Specification of Letters Patent.  Patented Dec. 14, 1915.

Application filed December 15, 1914. Serial No. 877,395.

*To all whom it may concern:*

Be it known that I, WILLIAM L. SUTTON, a citizen of the United States, residing at Niwot, in the county of Boulder and State of Colorado, have invented new and useful Improvements in Land-Levelers, of which the following is a specification.

This invention relates to a farm implement which may be denominated a land leveler, and it has for its object to construct a simple, inexpensive and thoroughly efficient machine or apparatus whereby land may be leveled, especially in irrigated regions, so that the irrigating water will cover the land evenly and effectively.

A further object of the invention is to provide a leveling machine having a scoop or cutting member which may be readily lifted to an inactive position when not needed for present use and which, when lowered, may be utilized to shave off portions of earth extending above the desired level without digging a hole or otherwise indenting the surface, the surplus dirt being carried by the machine to the desired point of deposit.

A further object of the invention is to produce a drag or float having earth leveling means and adapted to be used particularly for plowing the ground for the purpose of leveling and smoothing the surface.

With these and other ends in view which will readily appear as the nature of the invention is better understood, the same consists in the improved construction and novel arrangement and combination of parts which will be hereinafter fully described and particularly pointed out in the claim.

In the accompanying drawings has been illustrated a simple and preferred form of the invention, it being, however, understood that no limitation is necessarily made to the precise structural details therein exhibited, but that changes, alterations and modifications within the scope of the claim may be resorted to when desired.

Figure 1:
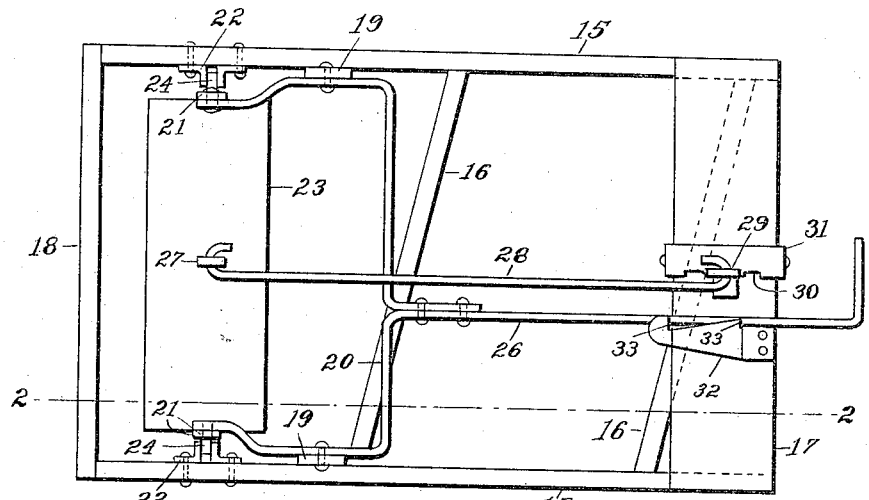
Figure 2:
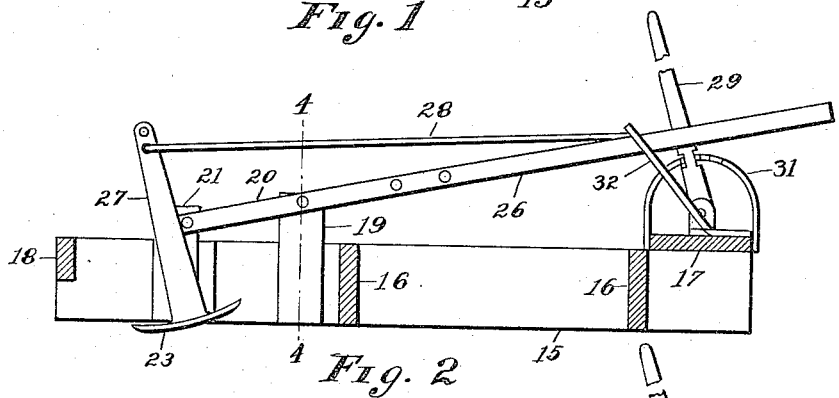
Figure 3:
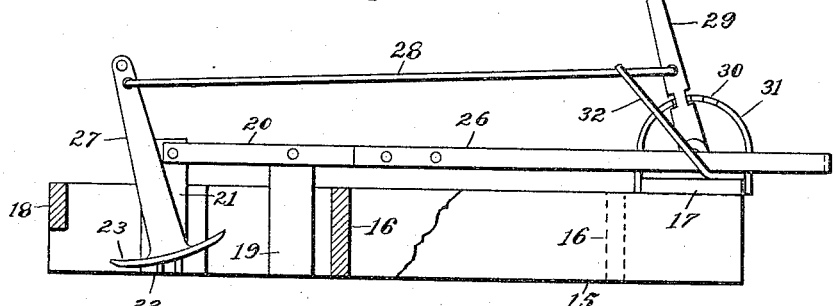
Figure 4:
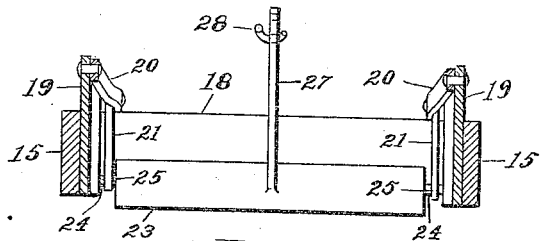
Figure 5:
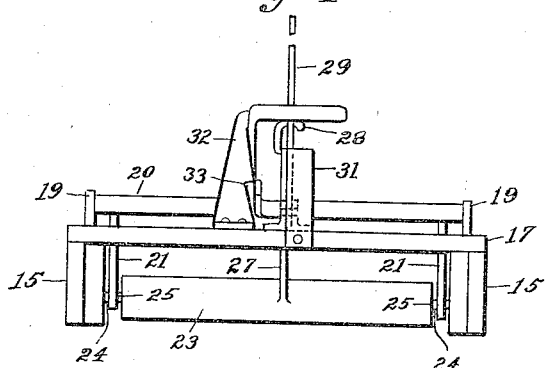
Figure 6:
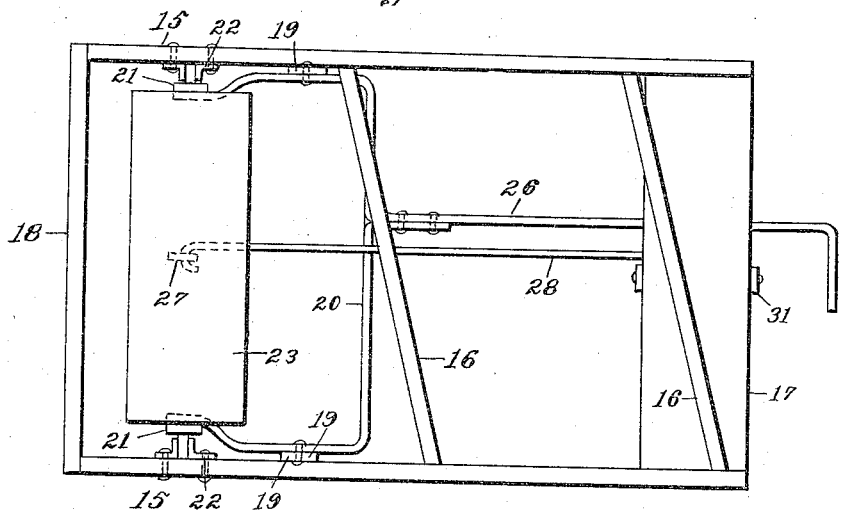

In the drawings, Figure 1 is a top plan view of a machine constructed in accordance with the invention. Fig. 2 is a longitudinal sectional view showing the scoop or scraper lowered to an earth engaging position. Fig. 3 is a side elevation of the machine partly in section and showing the scoop raised to an inactive position. Fig. 4 is a transverse sectional view taken on the line 4—4 in Fig. 2. Fig. 5 is a rear view. Fig. 6 is a bottom plan.

Corresponding parts in the several figures are denoted by like characters of reference.

The frame of the improved machine is composed of side members or runners 15 which are connected together and spaced apart by obliquely disposed members 16 and also at their rear ends by a top piece or cap piece 17 and at their front ends by a cross bar 18 which is supported in a plane above the lower ground engaging edges of the runners so that elevated portions or ridges of dirt may pass beneath said cross piece. The side faces 15 are provided with upwardly extending brackets 19 supporting a yoke 20, the forwardly extending limbs or arms of which are pivotally connected with the upper ends of links 21. The side pieces 15 are also provided on their inner faces with guides 22.

23 is a blade or scoop having axial pivot members or trunnions 24 which are guided in the guides 22, said pivot members being in engagement with eyes 25 at the lower ends of the links 21. The yoke 20 has a rearwardly extending arm or lever 26, whereby said yoke may be tilted, the effect of actuating the yoke being to move the scoop member or blade 23 upwardly or downwardly, as may be desired, said scoop being supported by the links 21 and guided in the guides 22. The scoop 23 has an arm 27 extending upwardly from the concave face thereof with respect to which said arm is about centrally disposed, that is to say, about midway between the side edges and also about midway between the front and rear edges, said arm being also positioned substantially at right angles with respect to the scoop. The arm 27 is connected by a rod 28 with a lever 29 fulcrumed on the rear cross bar 17 and adapted to engage retaining notches 30 in an arch 31, thereby serving to retain the scoop in various positions. An upright 32 having notches 33 is provided to engage the arm or lever 26 whereby the yoke 20 is actuated.

In operation, the improved implement may be dragged over the ground by animal or other power. Wherever the ground is sufficiently level the scoop is not employed, but it is, by actuating the yoke 20, raised to an elevated position where it will not engage the ground. The surface of the ground, then, will be engaged only by the obliquely disposed braces 16 and by the side members or runners 15, the joint action of which will serve to smooth and pack the ground. Where ridges or projections of dirt occur, the scoop is lowered, and the arm 27 of said scoop is tilted forwardly so that the front edge of the scoop will engage the dirt and remove the surplus projecting portions which will then be carried along with the machine until a suitable place of deposit is reached, when, by elevating the scoop and tilting it in the opposite direction, the accumulated dirt may be deposited. In this manner the inequalities in the surface which so frequently occur and which, while apparently slight, are yet sufficient to interfere with the equal distribution of irrigating water, may be done away with, thus enabling all parts of the ground to be reached by the irrigating water and thereby promoting the success of irrigation.

Having thus described the invention, what is claimed as new, is:—

A land leveler comprising a drag frame having ground engaging side bars, brackets rising from the side bars, guides on the inner faces of the side bars, a yoke pivoted on the brackets and having forwardly extending arms, a scoop blade having trunnions guided in the guides, links connecting the arms of the yoke with the trunnions, means for securing the tiltable yoke at various adjustments, and means for tilting the scoop and for securing it at various adjustments.

In testimony whereof I affix my signature in presence of two witnesses.

WILLIAM L. SUTTON.

Witnesses:
C. G. WALTON,
JOHN D. TAYLOR.

Copies of this patent may be obtained for five cents each, by addressing the "Commissioner of Patents, Washington, D. C."